INVENTOR.
Albin J. Burkman
BY D. C. Staley
HIS ATTORNEY

April 3, 1962  A. J. BURKMAN  3,027,980
VEHICLE-DRUM BRAKE
Filed Sept. 3, 1958  4 Sheets-Sheet 3

INVENTOR.
Albin J. Burkman
BY
D. C. Staley
HIS ATTORNEY

April 3, 1962 A. J. BURKMAN 3,027,980
VEHICLE-DRUM BRAKE
Filed Sept. 3, 1958 4 Sheets-Sheet 4

INVENTOR.
Albin J. Burkman
BY
D. C. Staley
HIS ATTORNEY

United States Patent Office 3,027,980
Patented Apr. 3, 1962

3,027,980
VEHICLE-DRUM BRAKE
Albin J. Burkman, Birmingham, Mich., assignor to General Motors Corporation, Detroit, Mich., a corporation of Delaware
Filed Sept. 3, 1958, Ser. No. 763,776
3 Claims. (Cl. 188—78)

This invention relates to a vehicle drum brake and more specifically, a vehicle brake which actuates on the trailing edge of the brake shoe.

The conventional type of vehicle brake on the present day automobile employs of a self-energizing principle whereby the brake shoes are forced into engagement with the rotating drum on the leading edge of the brake shoe. This type of a brake has the inherent feature of requiring less actuating pressure. Together with this feature, there is a disadvantage of being more sensitive to the variation of the coefficient of friction on the brake linings which may be due to any impurities including material such as moisture on the lining. With brake actuating means on the trailing edge of the brake shoe, a more stable operating brake is provided.

A further feature of the conventional brake structure is in mounting the brake actuating means on a backing plate and this combined with the wheel and drum encloses the brake structure. This type of a structure retains dissipated heat within the enclosing structure and thereby enhances the possibility of overheating the brake structure.

It is also advantageous to provide greater cooling. The later models of automobiles are incorporating a wheel of smaller diameter and therefore require a more compact braking unit. The smaller wheel combined with the increased weight and speed of the motor vehicle requires greater cooling.

It is an object of this invention to provide a vehicle drum brake wherein the brake actuating structures are mounted on a unitary member fastened to the central housing of the wheel driving means.

It is another object of this invention to provide a single member centrally mounted which incorporates wheel cylinders for actuating the brakes, brake shoe supporting and aligning means, manual adjustment on the actuating end at the brake shoes, and automatic adjustment on the pivoting anchor end of the brake shoes.

It is a further object of this invention to provide an open end wheel cylinder which includes a self-aligning push rod engaging the actuating piston and also a self-aligning socket on the opposite end engaging the brake shoe. This structure also includes means for manually adjusting the vehicle brakes together with a self-locking means on the adjustment.

It is a further object of this invention to provide an anchor means on a central unitary member. The anchor means which is on the pivoting end of the brake shoe is self-adjusting. The brake shoe supporting means on the unitary casting includes an anti-rattle device.

It is a further object of this invention to provide circulation of air throughout the internal portion of the brake drum and also to provide fins to create turbulence within the braking structure. The brake shoes are provided with radiating reinforcement webs and also include segments of friction material mounted on the outer periphery of shoes and having longitudinal and lateral grooves to permit circulation of air around the friction material of the brake shoes.

FIGURE 1 is a cross section view of the vehicle braking structure taken on line 1—1 of FIGURE 2.

FIGURE 2 is an elevation view taken in the direction of arrow 2 of FIGURE 1. Portions of the wheel are broken away to clarify the locations of the various parts of the wheel cylinder and the push rod for actuating the brake shoes. The drive shaft and housing are also in cross section.

Figure 1:
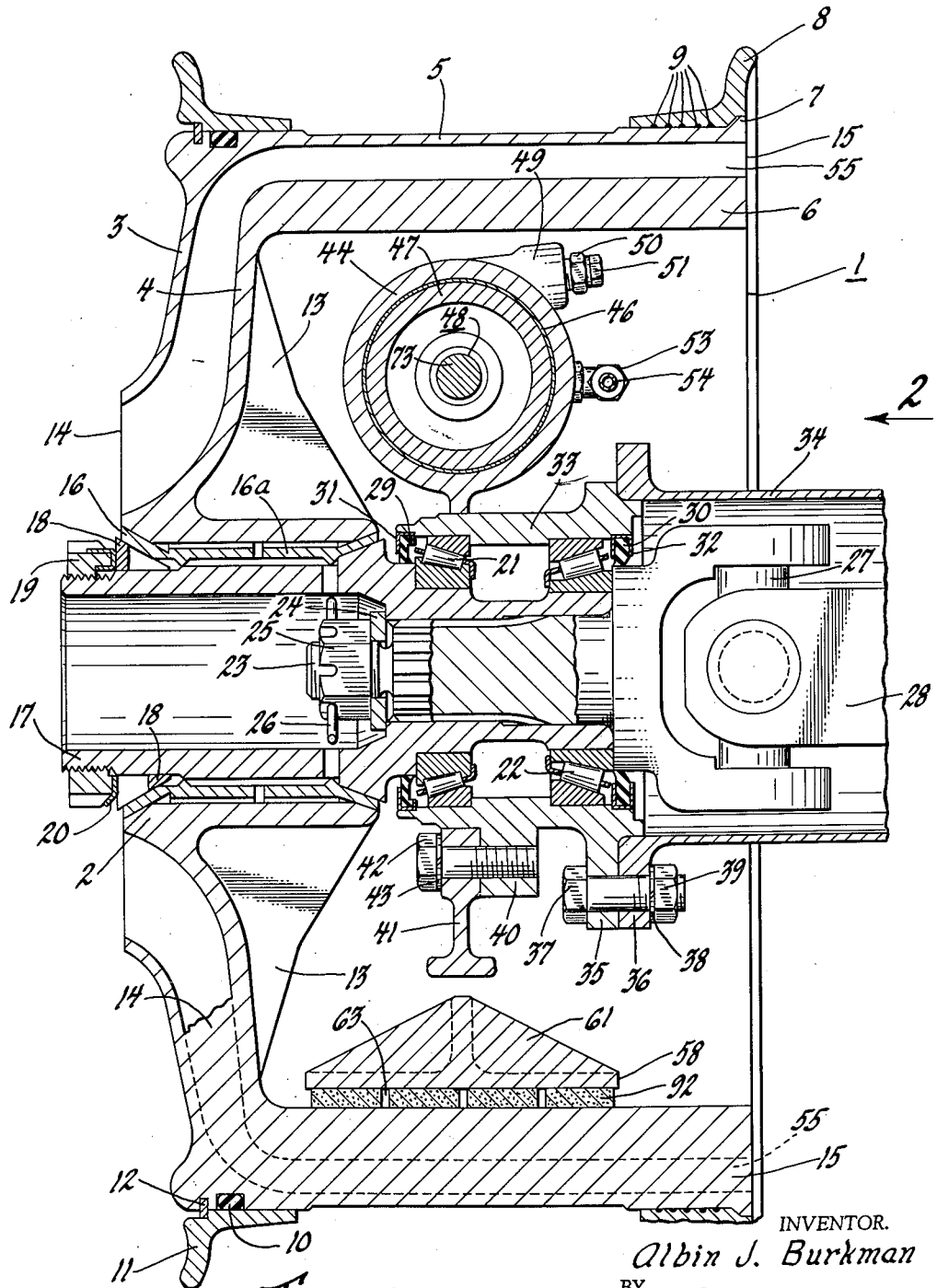
Figure 2:
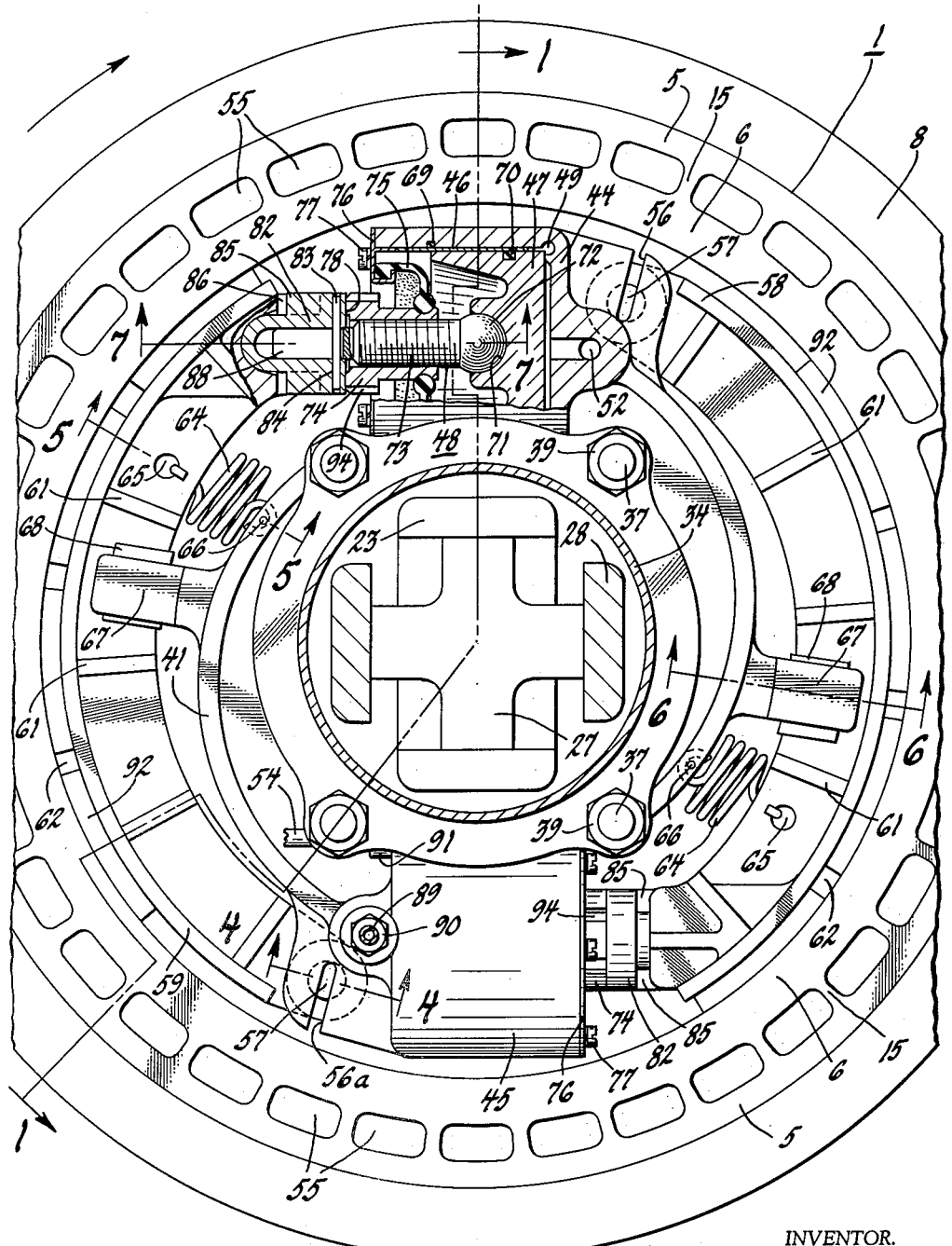

FIGURE 1 shows the cross section of the braking structure on a line 1—1 of FIGURE 2. The wheel 1 is a unitary casting including a hub section 2 with the radiating walls 3 and 4. The radiating walls 3 and 4 adjoin the rim section 5 and the drum section 6 respectively. This casting provides a continuous wall from the hub section including the radial wall 3 and the rim portion 5. The rim portion has an annular bead 7 on the inboard side which provides a mounting means for the tire mounting flange 8. The tire mounting flange 8 is provided with a sealing means 9 and is preferably shrunk fit to provide a tight seal between the tire flange 8 and the rim section 5. The outboard side of the wheel structure is provided with an O ring seal 10. The O ring seal 10 is placed within a groove in the rim 5 internal of the tire mounting flange 11. Tire mounting flange 11 is demountable and is maintained in position by a snap ring 12.

The hub section 2 and the inner radial wall 4 is adjoined by axial fins 13 which extend axially and create a turbulence of the air within the wheel structure. Radial vanes 14 are angularly spaced between the two radial walls 3 and 4. These angularly spaced vanes form a centrifugal pump within the radial wall structure. The radial vanes 14 continue radially outward where they adjoin the axial vanes 15 and form continuous passages from the outboard side of the wheel structure adjacent the hub section to the inboard side of the wheel structure between the rim and drum portion of the wheel.

The hub section 2 is spline connected to sleeves 16 and 16a within the inner periphery of the wheel hub 2. These sleeves also have spline connections on their inner periphery where they connect a mating portion on a driving sleeve 17. A beveled ring 18 is placed between the sleeve 16, and washer 20 with nut 19 on the outboard end of the driving sleeve 17. This structure provides for a self-aligning wheel structure as the nut 19 is threadedly screwed onto the driving sleeve 17 and engages the washer 20.

The driving sleeve 17 extends axially inboard and is rotatably mounted within the roller bearing assemblies 21 and 22. Sleeve 17 is spline connected to a driving shaft 23. The drive shaft 23 is securely fastened by means of washer 24, nut 25 and pin 26. The inboard side of the drive shaft 23 is provided with a bifurcated portion which forms a part of a universal joint. This bifurcated portion fastens on a four pronged pin 27 which in turn is connected to a bifurcated portion 28 of the inboard driving shaft.

The roller bearing assemblies 21 and 22 are also provided with the seals 29 and 30 which are mounted in retainers 31 and 32. These roller bearing assemblies 21 and 22 are internally mounted within the bearing housing 33. The bearing assembly 33 is securely fastened to the shaft housing 34 by the radially extending flanges 35 of the bearing housing and flange 36 of the shaft housing. Bolts 37, washers 38 and nuts 39 securely lock these two members in a fixed relation to each other.

The bearing housing 33 is also provided with an additional radially extending flange 40 which serves as a mounting for the unitary casting or brake spider 41. The spider is connected by means of bolts 42 and washers 43 and threadedly engages holes within the bearing housing 33. The spider includes two open end wheel cylinders 44 and 45. Cylinder 44 is provided with a liner sleeve 46. The piston 47 is operatively placed within piston 44 and engages the spherical head 72 of push rod 48. A bleeder passage 49 is provided on the upper end of wheel cylinder 44. A plug 51 and fitting 50 are placed in passage 49 for bleeding of the wheel cylinders. The inlet passage 52 is provided on wheel cylinder 44 and has a fitting 53 connected to the conduit 54.

FIGURE 2 is an elevation view of the wheel structure from the inboard side of the wheel. The wheel structure shows the tire mounting flange 8 and the outlet passages 55 extending axially between the rim section 5 and the drum section 6. The spider 41 is shown mounted on the bearing housing 33. Spider 41 is provided with slots 56 and 56a which are inclined slightly to a radial line. The radially inner end of the slot being slightly forward in the direction of forward rotation of a radial line extending through the outer end of the slot. The direction forward is indicated in relation to the forward rotation of the wheel by the arrow in FIGURE 2. The slot 56a receives a pin 57 which serves as a mounting means for the pivoting end of the brake shoe 59. The pin has an elongated portion within the slot 56. The center portion of the pin is enlarged and serves as the mounting portion for the brake shoe 59. Between the spider and the brake shoe on both sides is inserted a belleville spring 60 and 60a. These belleville springs create an axial force in relation to the pin 57. This force maintains a friction between the spider 41 and the shoe 59. The slot permits movement of the pin and the springs to a new location in relation to the spider 41 when an excess of clearance exists between the brake shoe 59 and the drum 6.

The brake shoe 58 is symmetrical with the shoe 59. The mounting of shoes 58 and 59 are the same as the opposite halves of the unitary casting are symmetrical. Shoe 59 is mounted by means of the slot 56a. The shoes are provided with heat radiating reinforcing ridges 61. The portion between the radiating ridges 61 is of a generally T-shaped cross section. The friction material which is mounted on the outer periphery of the brake shoes is mounted in segments. These segments have lateral grooves 62 between the brake shoe 58 and the brake drum 6. Circumferential extending slots 63 are also provided between the adjacent sides of the segments of the friction material. These grooves provide for circulation of air between the brake shoes and the engaging drum. The brake shoes also are provided with retraction springs 64 for retracting the brake shoes from engagement with the rotating drum. The radial outer portion of spring 64 engages a hole 65 in the brake shoe webbing. Radial inner portion of spring 64 engages a pin 66 which extends through a hole in the unitary casting 41 which is mounted on the bearing housing.

Figure 6:
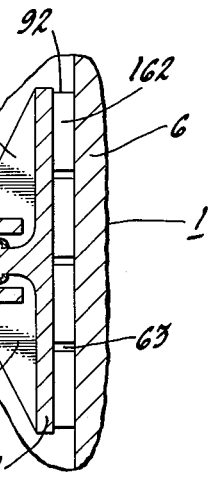
FIGURE 6 is taken on line 6—6 of FIGURE 2 and is a fragmentary cross section view of the shoe supporting structure including the anti-rattle device.
Figure 5:
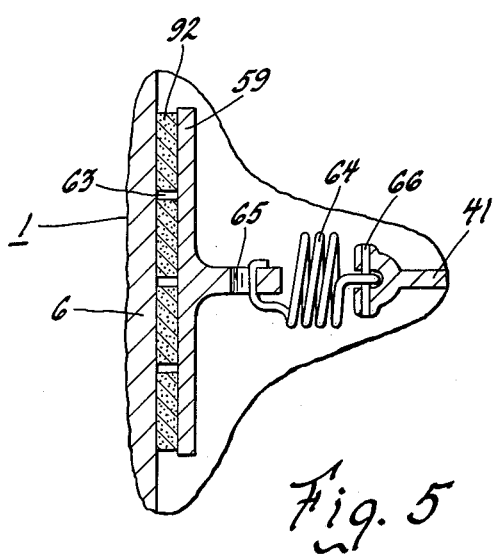
FIGURE 5 is a fragmentary cross section view taken on line 5—5 of FIGURE 2. This shows a retracting spring connected to the spider or casting, and the brake shoe.

The brake shoes are supported by the bifurcated portion 67 of the spider 41. An anti-rattle means is provided by the use of a structure 68 having a U-shaped cross section. This U-shaped spring structure is shown in FIGURE 6 engaging the brake shoe webbing on its inner side and bifurcating member 67 on its outer side. The wheel cylinders are provided with cooperating pistons. Cylinder 44 has an internal sleeve 46 and an O ring seal 69 between the cylinder and the sleeve. The piston 47 also has an annular groove about its outer periphery for receiving the O ring seal 70. The center portion of the piston is provided with a socket 71 for receiving the spherical head 72 of the push rod 48. Push rod 48 has a threaded portion 73 adjacent to the spherical head. This threaded portion extends to a shoulder portion on the opposite end of the pin. The threaded portion 73 threadedly engages the inner periphery of a nut 74. The nut 74 also has an annular groove about its outer periphery and the end adjacent to the piston 47. This groove receives a sealing boot 75. The sealing boot 75 extends radially and axially forward where it is placed within a sheet metal member 76. The sheet metal member 76 is mounted in position by means of screw 77 and extends into cylinder 44 and operates as a retaining means for the sleeve 46.

Figure 3:
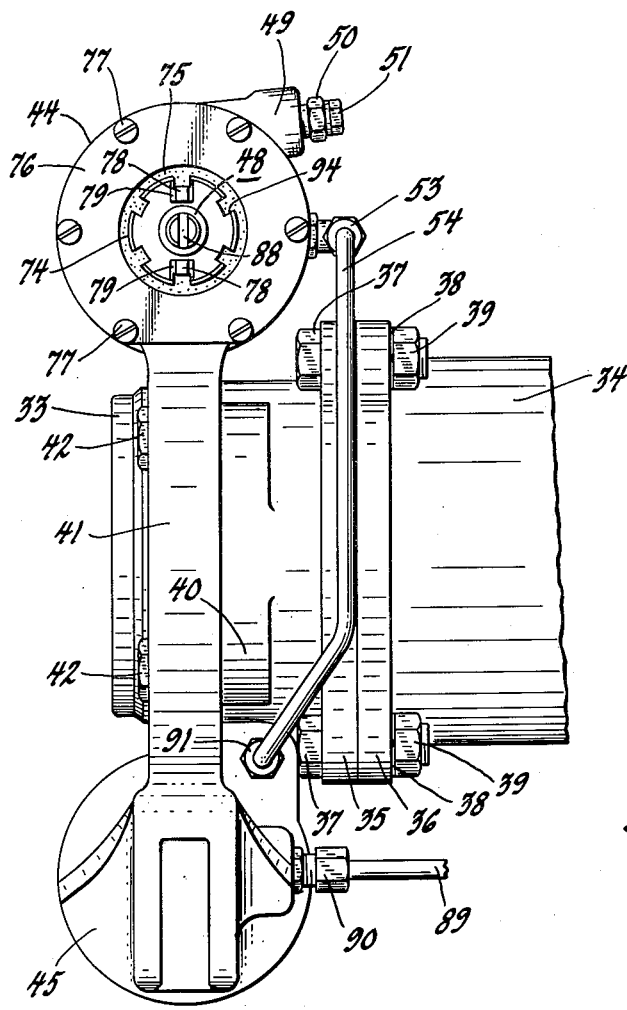
FIGURE 3 is an elevation view showing the push rod and the wheel cylinder and the unitary casting mounted on the bearing housing. The brake shoe is removed from this view to more clearly show the mounting of the unitary casting or brake spider.
Figure 4:
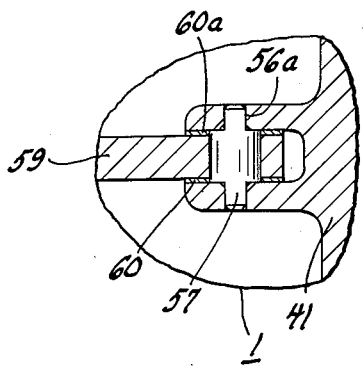
FIGURE 4 is a fragmentary cross section view taken on line 4—4 of FIGURE 2. This view shows the belleville springs mounted between the brake shoe and the brake spider or unitary casting.
Figure 7:
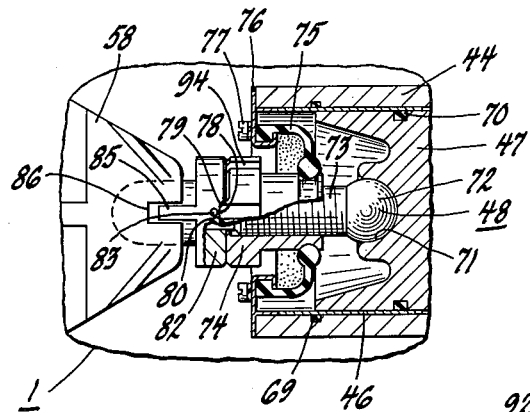
FIGURE 7 is a fragmentary cross section view taken on line 7—7 of FIGURE 2. This view shows the self-aligning push rod assembly and the manual brake adjusting means.

The nut 74 is provided with a locking detent 78 which is shown in FIGURES 2, 3 and 7. This detent 78 is an axially extending portion on the radial outer portion of the nut 74. The adjoining shoulder portion on the circumferential sides 79 of the detent 78 are beveled to permit rotation. Two detents 78 are provided on the nut 74. These detents 78 fit into mating slots 80 on a socket head 82. The socket head 82 receives the outer end of push rod 48 within its cylindrical central opening. The forward end of push rod 48 has a cylindrical shape and a slot 88 cut longitudinal within this portion of the push rod. This longitudinal slot 88 receives a pin 83 which is inserted within the hole 84 of the socket head 82. By inserting the pin 83 into the longitudinal slot of push rod 48, the push rod is held in a non-rotating position in relation to the socket head 82. The socket head 82 has a longitudinal extending ridge 85 on two of its sides. These ridges extend into grooves 86 in the end of the brake shoes. The ridge and groove combination maintains a non-rotative relation between socket head 82 and the brake shoe 59.

The nut and socket head assembly is held in non-rotating position as spring 64 forces the brake shoe 59 against the push rod assembly. When adjustment is made, the nut 74 is rotated and the extended portion or detent 78 moves out of its mating slot 80. As the nut 74 is rotated 180° in relation to the socket head 82, the detents 78 again drop into their mating grooves. The tension of spring 64 maintains the relative non-rotating position in relation to each other.

FIGURE 3 illustrates the mounting of the unitary casting or spider on the bearing housing. The bearing housing 33 is connected to the shaft housing 34 by the bolts 37, washers 38 and nuts 39. This view also shows the longitudinal slot 88 and the push rod 48. The shoulder portion is also shown on the push rod. The detent 78 is also shown on nut 74.

The fluid connections are more clearly shown in this view. The inlet conduit 89 is shown connected to the fitting 90 in the spider. Conduit 89 leads to the fluid actuating fluid system. The connecting conduit 54 is connected to fitting 91 and fitting 53. This type of a connection permits equal actuation of fluid cylinders 44 and 45 from the inlet conduit 89.

The friction material 92 is mounted on the brake shoes 58 and 59 in segments 162. Segments 162 are in spaced relation from each other to provide longitudinal grooves 63 and lateral grooves 62 for circulation of air.

The braking device operates in the following manner. As the fluid is pressurized within the conduit 89 and 54, the wheel cylinders 44 and 45 are also pressurized. This creates the same axial movement of the pistons within their wheel cylinders. The piston 47 moves axially outward carrying the push rod 48. Push rod 48 threadedly engages the nut 74 and creates a pressure on the socket head 82. This force is transmitted through the spherical head of the socket head 82 to the end of the brake shoe 59. The reaction is similar on the corresponding end of brake shoe 58. The brake shoes are then forced radially outward against the inner periphery of drum 6 where the friction material 92 engages the inner periphery of the rotating drum 6. It is noted that the rotation of the rotating drum is in opposition to the actuating force from the wheel cylinders, in other words, the brake actuation is on the trailing edge of the brake shoe. This type of operation provides for a uniform increase of output torque in relation to the input force of the wheel cylinder. The actuating force from the piston forces the friction material 92 against the drum. If an excessive clearance exists between the rotating drum 6 and the friction material on the brake shoes 59, the pivoting end of the brake shoe will be forced radially outward against the drum. This movement is accomplished by the slot being slightly inclined in the direction of the actuating force to a radial line. As the brake actuating force acts on the inclined slot, a radial component is produced which moves the pivoting end of the brake shoe outward so the friction material engages the drum.

This movement is provided for through the means of the pivoting pin 57 held in the brake spider. The friction of the belleville springs 60 and 60a on the spider and the shoe retain the new position of the pivoting end of the brake shoe when the brake shoe pivots radially inward from the rotating drum. The inward movement of the brake shoe is accomplished by means of the retraction spring 64.

When the fluid within the wheel cylinders is no longer pressurized, the piston 47 will return to its retracted position. This action is accomplished by means of spring 64 operating on the socket head 82 on the forward end of the push rod assembly.

The brake shoes are held in position by means of bifurcated portion 67 of the spider 41. This bifurcated portion prevents axial movement of the brake shoes the same as the slotted opening adjacent to the pivoting pin section of the brake shoe. Bifurcated portion 67 is also provided with an anti-rattle U-shaped spring device 68. This device creates constant pressure between the bifurcated portion 67 and the brake shoe webbing.

The push rod assembly is provided with a manual adjustment. The nut 74 has axially extending grooves 94 on its outer periphery. These grooves permit the rotation of nut 74 by some manual means. The axially extending portions or detent 78 on this nut fit into a mating beveled groove portion 80 in the socket head 82. The nut 74 may be rotated by forcing the socket head 82 axially outward against the counter force of spring 64. As the nut 74 is rotated 180° in relation to the socket head 82, the axially extending portion 78 again drops into the complementary groove 80 on socket head 82. The nut 74 may be rotated in relation to socket head 82 until the desired clearance exists between the friction material 92 on shoe 59 and the rotating drum 6. The tension of spring 64 retains the nut 74 and socket head 82 in non-rotative relationship when the detent 78 fits into the mating groove 80.

This type of a brake actuating structure actuates on the trailing edge of the brake shoe. The brake shoe is forced radially outward against the inner periphery of the brake drum. For an increase in brake actuating pressure of the brake cylinder, a corresponding increase in decelerating torque is transmitted on the brake drum. The device is provided with a self-adjusting means on the pivoting end of the brake shoe. A manual means for adjusting is provided on the actuating end of the brake shoe. During the operation of the brakes, constant turbulence of air is created on the braking structure by the fins 13. The metal employed in this braking structure is preferably of a material such as aluminum or magnesium which has a high thermo conductivity and thereby creates rapid radiation of the heat within the braking structure. The radial walls of the wheel and the rim and drum section forming passages also are of a similar material and provide for rapid cooling of the brakes.

The turbulence created in the inner portion of the braking structure also is provided for circulation between brake shoes and the brake drum by the lateral and circumferential slots between the friction material. The brake shoes have radiating reinforcement ridges to increase the conduction of the heat dissipated within the brake shoes.

This type of a braking structure provides for a more stable operation, more rapid cooling and a simplicity in manufacturing.

While the embodiment of the present invention as herein disclosed constitutes a preferred form, it is to be understood that other forms might be adopted.

What is claimed is as follows:

1. In a drum brake having a pair of brake shoes, a brake drum mounted on a drive shaft normally for rotation in one direction, said drive shaft extending through a non-rotatable housing, said drum surrounding said brake shoes and adapted to be frictionally engaged thereby, the improvement comprising a unitary annular spider member adapted to be fixedly mounted on said drive shaft housing, said spider member including two diametrically opposed wheel cylinder housings circumferentially spaced thereon, each housing separating a first brake shoe end from a second brake shoe end, said first mentioned end being the trailing end of one of said brake shoes with respect to the normal rotation of said brake drum, said second mentioned end being the leading end of said other brake shoe with respect to the normal rotation of said brake drum, means confined in said wheel cylinder housings for applying a simultaneous braking force to each of said brake shoe trailing ends, means associated with said force applying means for adjusting the distance between each of said brake shoe trailing ends and said rotating drum, two diametrically opposed bifurcated brake shoe supports circumferentially spaced on said spider, substantially radially extending compensating slots in said spider adjacent said wheel cylinder housings, each having its radially inward end positioned to lead its radially outward end in the direction of normal drum rotation, means situated in said slots for slidably and pivotally connecting each one of said second mentioned brake shoe ends to said spider, spring means associated with said slots for resisting predetermined radial forces acting on said connecting means, two diametrically opposed springs circumferentially spaced on said spider each connected to a brake shoe and positioned to urge its respective brake shoe from the drum, whereby normal drum rotation is opposed by a braking force applied to said drum when the trailing ends of said brake shoes frictionally engage the rotating surface of said drum creating a torsional action between said rotating brake drum surface and the frictionally engaged non-rotating brake shoe surface, thereby causing said brake shoes to roll into progressive maximum drum contact.

2. In a drum brake according to claim 1 wherein a U-shaped anti-rattle spring is situated in each of said bifurcated supports to minimize vibrations of the brake shoes.

3. A brake shoe supporting and actuating means for use in a vehicle drum brake comprising in combination a unitary member adapted for mounting on a drive shaft housing, two diametrically opposed open end hydraulic wheel cylinders formed in said unitary member, hydraulic piston means disposed within said open end wheel cylinders, said hydraulic piston means comprising push rods, a pair of brake shoes disposed about said unitary member with said open end wheel cylinders located therebetween and with a trailing end of each brake shoe in engagement with a push rod, hydraulic piston means being operable to urge its respective trailing end of the shoe toward the drum, slots for reception of pins formed in said unitary member adjacent the closed ends of said hydraulic wheel cylinders, each opposite adjacent end of said brake shoes having means for receiving one of said pins, friction means for seating each said pin within each said slot of said unitary member, said slot being substantially radially extending and having its radially inward end positioned to lead its radially outward end in the direction of normal drum rotation to provide a radial outward force component that increases the braking pressure at said opposite adjacent brake shoe ends as said brake shoes are actuated, providing automatic adjustment of the pivoting end of said brake shoe upon actuation of said vehicle brakes, and whereby operation of said piston push rods with the trailing end of said brake shoes causes the brake shoes to be assisted in a progressively rolling contact with said vehicle drum until a maximum braking engagement is achieved.

References Cited in the file of this patent

UNITED STATES PATENTS

| | | |
|---|---|---|
| 1,554,988 | Carroll | Sept. 29, 1925 |
| 2,082,244 | Dick | June 1, 1937 |
| 2,089,508 | Sneed | Aug. 10, 1937 |
| 2,380,814 | Whitacre | July 31, 1945 |
| 2,429,815 | House | Oct. 28, 1947 |
| 2,609,892 | Smith | Sept. 9, 1952 |
| 2,765,883 | Chayne | Oct. 9, 1956 |
| 2,801,713 | Trahern | Aug. 6, 1957 |
| 2,889,015 | White | June 2, 1959 |

FOREIGN PATENTS

| | | |
|---|---|---|
| 53,716 | France | Mar. 25, 1946 |
| 675,579 | Great Britain | July 16, 1952 |